(12) United States Patent
Mavaddat

(10) Patent No.: US 12,488,070 B1
(45) Date of Patent: Dec. 2, 2025

(54) TRANSPARENT AND ADAPTIVE LEARNING ANTI-PIRACY SERVICE FOR MEDIA FILES

(71) Applicant: Amazon Technologies, Inc., Seattle, WA (US)

(72) Inventor: Matin Mavaddat, Oxford (GB)

(73) Assignee: Amazon Technologies, Inc., Seattle, WA (US)

(*) Notice: Subject to any disclaimer, the term of this patent is extended or adjusted under 35 U.S.C. 154(b) by 176 days.

(21) Appl. No.: 18/066,089

(22) Filed: Dec. 14, 2022

(51) Int. Cl.
*G06F 21/10* (2013.01)
*G06N 5/048* (2023.01)
*H04N 1/32* (2006.01)

(52) U.S. Cl.
CPC ......... *G06F 21/1063* (2023.08); *G06N 5/048* (2013.01); *G06F 21/101* (2023.08); *H04N 1/32144* (2013.01)

(58) Field of Classification Search
CPC .. G06F 21/1063; G06F 21/101; G06F 21/106; G06F 21/10; G06N 5/048; H04N 1/32144
See application file for complete search history.

(56) References Cited

U.S. PATENT DOCUMENTS

| | | | | |
|---|---|---|---|---|
| 5,191,638 A * | 3/1993 | Wakami | ................ | G06N 5/048 706/50 |
| 5,471,559 A * | 11/1995 | Yasunobu | ............... | G06N 5/022 706/900 |
| 2002/0157005 A1* | 10/2002 | Brunk | ................ | H04N 1/32154 713/176 |
| 2004/0247120 A1* | 12/2004 | Yu | .................... | H04N 21/23892 375/E7.018 |
| 2007/0110240 A1* | 5/2007 | Moskowitz | ........ | H04N 21/8358 380/252 |
| 2008/0104186 A1* | 5/2008 | Wieneke | ............... | H04L 51/212 709/206 |
| 2009/0133079 A1* | 5/2009 | Li | .......................... | H04L 43/00 725/93 |
| 2009/0183258 A1* | 7/2009 | Isogai | ..................... | G06F 21/16 706/54 |
| 2015/0254102 A1* | 9/2015 | Ueda | ..................... | G06F 9/4881 718/102 |
| 2017/0228640 A1* | 8/2017 | Ivanov | ..................... | G06N 3/08 |
| 2017/0230418 A1* | 8/2017 | Amar | ...................... | H04L 63/10 |

(Continued)

OTHER PUBLICATIONS

Zadeh, L. A., "Fuzzy Sets," Information and Control, vol. 8, Issue 3, Jun. 1965, pp. 338-353.

*Primary Examiner* — William R Korzuch
*Assistant Examiner* — Aditya Sriram
(74) *Attorney, Agent, or Firm* — NICHOLSON DE VOS WEBSTER & ELLIOTT LLP

(57) ABSTRACT

Techniques for implementing a fuzzy logic expert system/ service to control sending of a requested media file and/or control triggering of a remedial action (e.g., not sending the media file) are described. According to some examples, a computer-implemented method includes receiving a request at a content delivery service from a user for a media file, generating a piracy risk score for the media file by a fuzzy logic expert service of the content delivery service, sending the media file to the user based on the piracy risk score not exceeding a threshold, and blocking the sending of the media file to the user based on the piracy risk score exceeding the threshold.

20 Claims, 13 Drawing Sheets

(56) References Cited

U.S. PATENT DOCUMENTS

| | | | |
|---|---|---|---|
| 2020/0226233 A1* | 7/2020 | Penugonda | H04L 9/3239 |
| 2021/0337282 A1* | 10/2021 | Chhabra | H04N 21/44236 |
| 2022/0004814 A1* | 1/2022 | Dooley | G06F 9/453 |
| 2023/0086191 A1* | 3/2023 | Jakobsson | H04L 9/3231 |
| | | | 705/66 |

* cited by examiner

TRANSPARENT AND ADAPTIVE LEARNING ANTI-PIRACY SERVICE FOR MEDIA FILES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various examples in accordance with the present disclosure will be described with reference to the following drawings.

DETAILED DESCRIPTION

Figure 1:
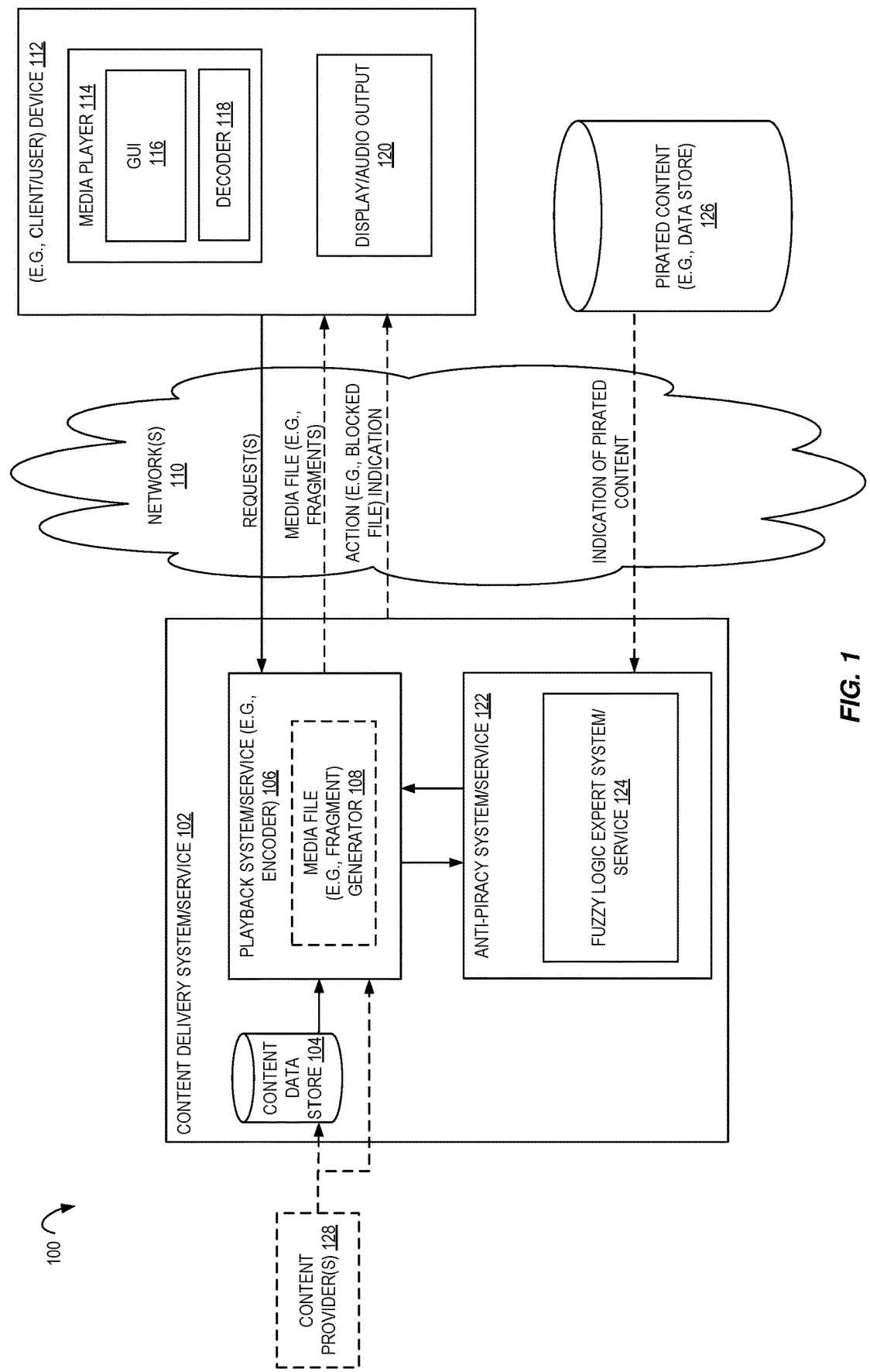
FIG. 1 is a diagram illustrating an environment including a content delivery system/service, having an anti-piracy system/service, to generate and send media files (e.g., fragments) to a device according to some examples.

The present disclosure relates to methods, apparatus, systems, and non-transitory computer-readable storage media for generating a piracy risk score for a requested file using a fuzzy logic inference. More particularly, certain examples herein utilize a fuzzy logic inference system/service (e.g., a fuzzy logic expert system/service) to control sending of a requested file and/or control triggering of a remedial action. In certain examples, the fuzzy logic inference system/service is a transparent, adaptive, and learning anti-piracy solution for preventing the unauthorized access and/or distribution of protected (e.g., media) files.

In certain examples, online (e.g., internet) piracy includes downloading and/or distributing copyrighted works (e.g., such music, video, and/or software) digitally without permission, e.g., where the copyright provides its owner the exclusive right to copy, distribute, adapt, display, and perform a creative work (e.g., for a limited time). This unauthorized downloading and/or distributing of certain copyrighted works (e.g., files) causes lost profits for the copyrighted material itself as well as any associated advertising revenue that is also lost.

In certain examples, it is desirable to use an expert system/service (e.g., a fuzzy logic expert system/service) instead of a machine learning (ML) model system/service because large amounts of labelled data are not available to train the ML models for piracy detection, but years of accumulated expert knowledge and heuristics (e.g., to generate rules) are available. In certain examples, it is desirable to use an expert system/service (e.g., a fuzzy logic expert system/service) instead of a machine learning (ML) model system/service because the decisions must be justifiable (for example, a "black box" ML approach is not acceptable, e.g., where a human cannot understand what particular violation occurred according to the ML model), e.g., such that the expert system/service (e.g., customer representative using such an expert system/service) provides an explanation to the customer about the expert system's/service's decisions (e.g., a decision to not send the file to their user/client). In certain examples, this explanation for performing a remedial action (e.g., not sending the requested file to the user and/or providing a lower quality version of the requested file to the user) includes an identification of at least one fuzzy logic rule that was violated. In certain examples, it is desirable to use an expert system/service (e.g., a fuzzy logic expert system/service) that is scalable and extensible. In certain examples, it is desirable to use an expert system/service (e.g., a fuzzy logic expert system/service) that is not static, e.g., the expert system/service (e.g., a fuzzy logic expert system/service) adapts (e.g., dynamically adapts) to new piracy techniques.

Certain examples herein are directed to an expert system/service (e.g., a fuzzy logic expert system/service) that increases the cost of pirating (e.g., copying) content by introducing blockers, adds difficulty to the piracy efforts to make it less lucrative for pirates, increases the time to first copying (e.g., "ripping") for recently released titles, and/or increase the re-streaming lag for live content. In certain examples, this solution is based on risk decisioning of playback request transactions using a fuzzy inference system/service (e.g., fuzzy expert system), for example, that enacts its decisions using a decision generator (e.g., decision execution engine) that uses the piracy risk score (e.g., of digital rights management (DRM)) in conjunction with edge computing capabilities to block the playback, reduce its quality, or continue the monitoring.

In certain examples, expert services/systems are computer services/systems that attempt to imitate the ability of human diagnostic decision-making. In certain examples, fuzzy logic is a many-valued (e.g., greater than 2 possible values) logic in which the truth value of a variable is selectable as any number between 0 and 1 (or 100, etc.). In certain examples, fuzzy logic is utilized to indicate a "partial" truth, e.g., where the truth value may range between completely true and completely false. By contrast, in Boolean logic, the truth value of a variable is selectable only from the integer value of 0 or 1. In certain examples, a fuzzy set is a class of objects with a continuum of grades of membership, e.g., where such a set is characterized by a membership (e.g., characteristic) function which assigns to each object a grade of membership ranging between zero and one (or 100, etc.).

In certain examples, a fuzzy logic expert system/service is an expert system/service that uses fuzzy logic, e.g., instead of Boolean logic. In certain examples, the fuzzy expert system/service is a collection of membership functions and rules that are used to reason about data. In certain examples, the rules in a fuzzy expert system/services are in a form similar to the following:

if a is low and b is high then c=medium where a and b are input variables (e.g., names for known data values), c is an output variable (e.g., a name for a data value to be computed), low is a membership function (e.g., "fuzzy subset") defined on a, high is a membership function defined on b, and medium is a membership function defined on c. In certain examples, the part of the rule between the "if" and "then" is the rule's "premise" (e.g., "antecedent"). This is a fuzzy logic expression that describes to what degree the rule is applicable. The part of the rule following the "then" is the rule's "conclusion" (e.g., "consequent"). This part of the rule assigns a membership function to each of one or more output variables. In certain examples, a tool for working with fuzzy expert systems/services allow more than one conclusion per rule. In certain examples, a fuzzy expert system/service has more than one rule, e.g., where the entire group of rules is collectively known as a "rule base" (e.g., "knowledge base").

Certain examples herein are directed to a fuzzy logic expert system/service that receives a request at a content delivery service from a user for a (e.g., media) file, generates a piracy risk score for the file by the fuzzy logic expert system/service, and then (i) sends the file to the user based on the piracy risk score not exceeding a threshold, and (ii) performs a remedial action for the file, requested by the user, based on the piracy risk score exceeding the threshold. A content provider (e.g., via a content delivery system/service) may offer thousands (or millions) of videos (e.g., series and/or movies) for its customers.

Examples herein are not performed by a human because a fuzzy logic expert system/service cannot practically be performed in the human mind (or by a human using a pen and paper), e.g., because such a solution is not practically scalable and extensible and cannot be performed in the available time between receipt of a request for a (e.g., media) file until a user expects to receive a response, e.g., in "real-time".

Certain examples herein utilize the fuzzy logic expert system/service to insert and/or search for a covert watermark for a (e.g., media) file.

FIG. 1 is a diagram illustrating an environment 100 including a content delivery system/service 102, having an anti-piracy system/service 122, to generate and send media files (e.g., fragments) to a (e.g., client or user) device 112 according to some examples. The depicted content delivery system 102 includes a content data store 104, which may be implemented in one or more data centers. In one example, the media file (e.g., video file that is to be viewed by the device 112) is accessed (for example, from the content data store 104 or directly from a content provider 128, e.g., as a live stream) by playback system/service (e.g., encoder) 106 (e.g., by media file (e.g., fragment) generator 108). In certain examples, the (e.g., client) device 112 requesting the media file (e.g., fragment(s) of media) from content delivery system 102 causes the playback system/service (e.g., encoder) 106 to encode the video file, e.g., into a compressed format for transmittal on network(s) 110 to device 112. In one example, the media file generator 108 generates one or more subsets (e.g., frames, fragments, segments, scenes, etc.) of the media file (e.g., video), e.g., beginning with accessing the media file and generating the requested media (e.g., fragment(s)). In one example, each fragment includes a plurality of video frames.

It may be desirable to determine is such a request is from a risky source, e.g., a device 112 associated with an undesirable risk of being a content pirate. Certain examples herein thus utilize an anti-piracy system/service 122 to check the request from the device 112 (e.g., checking via fuzzy logic expert system/service 124) and make a decision about how to handle the request (e.g., send the requested file, not send the requested file, send a reduced quality version of the file, etc.), e.g., determined based on a risk (e.g., piracy) score generated by the anti-piracy system/service 122 (e.g., fuzzy logic expert system/service 124 thereof). In certain examples, the content delivery system/service 102 (e.g., anti-piracy system/service 122) sends an indication (e.g., blocked file indication for a blocked file) to the device 112, e.g., for viewing by the client/user on display 120 and/or hearing from the audio output 120.

In FIG. 1, content delivery system/service 102 is coupled to device 112 via one or more networks 110, e.g., a cellular data network or a wireless local area network (WLAN).

Depicted device 112 includes a media player 114 having a graphical user interface (GUI) 116, e.g., to display an indication, and decoder 118 to decode the media file (e.g., fragment) from the content delivery system 102, e.g., to display video and/or audio of the media file on display and/or audio output 120, respectively.

Figure 7:
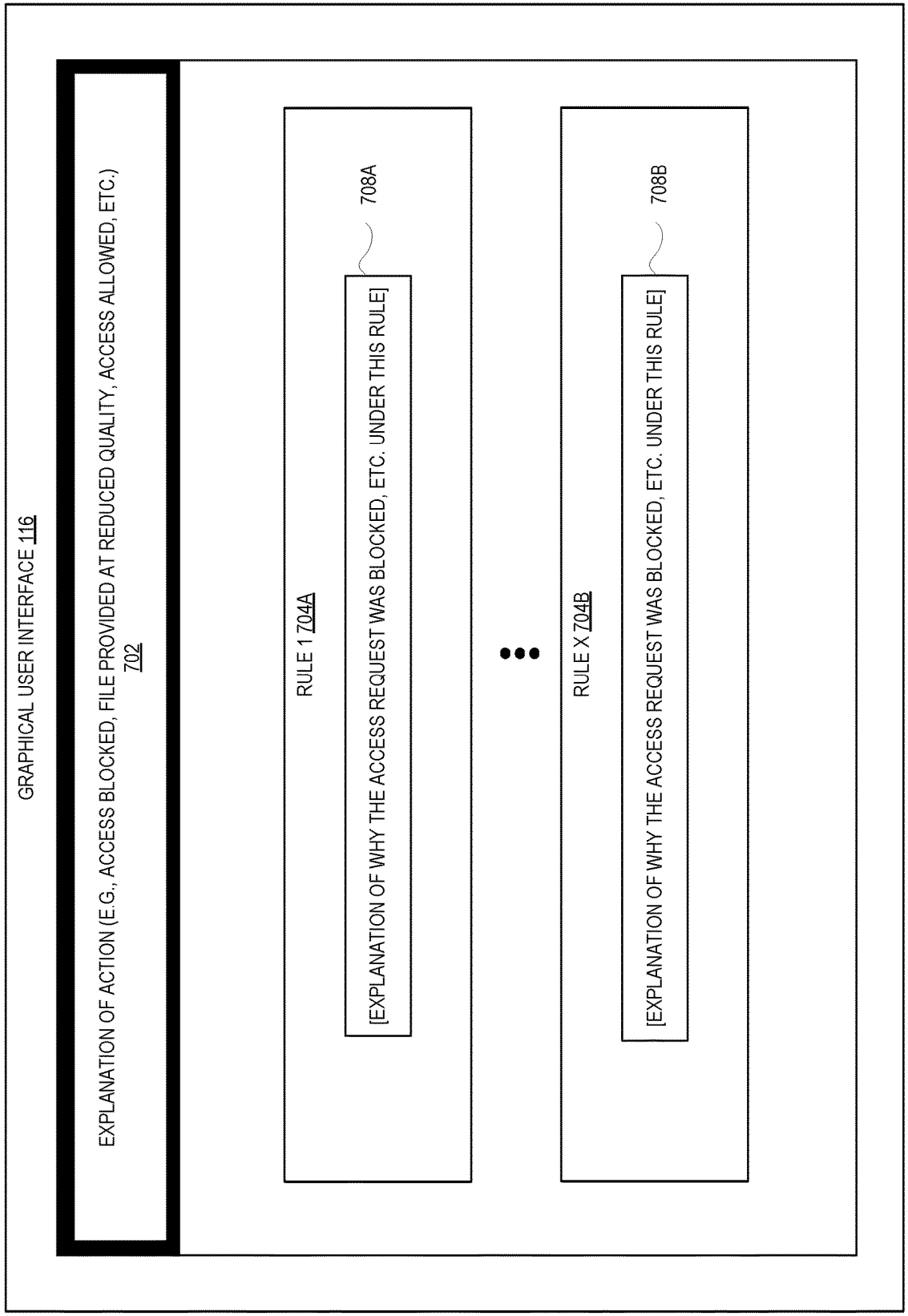
FIG. 7 is a diagram illustrating a graphical user interface for an indication to a user that explains an action performed by an anti-piracy system/service according to some examples.

In one example, display 120 is to present GUI 116 to a user of the device 112, e.g., GUI as discussed in reference to FIG. 7. The choice of what indication to be presented to the user may be by the content delivery provider, e.g., to indicate which (if any) of the fuzzy logic rules were triggered.

In certain examples, pirated content (or an indication thereof) 126 is stored in a data store (e.g., external from the content delivery system/service 102 and/or device 112). In certain examples, anti-piracy system/service 122 is to access pirated content, e.g., to check if a file sent from content delivery system/service 102 shows up, e.g., as discussed herein with watermarking.

Figure 2:
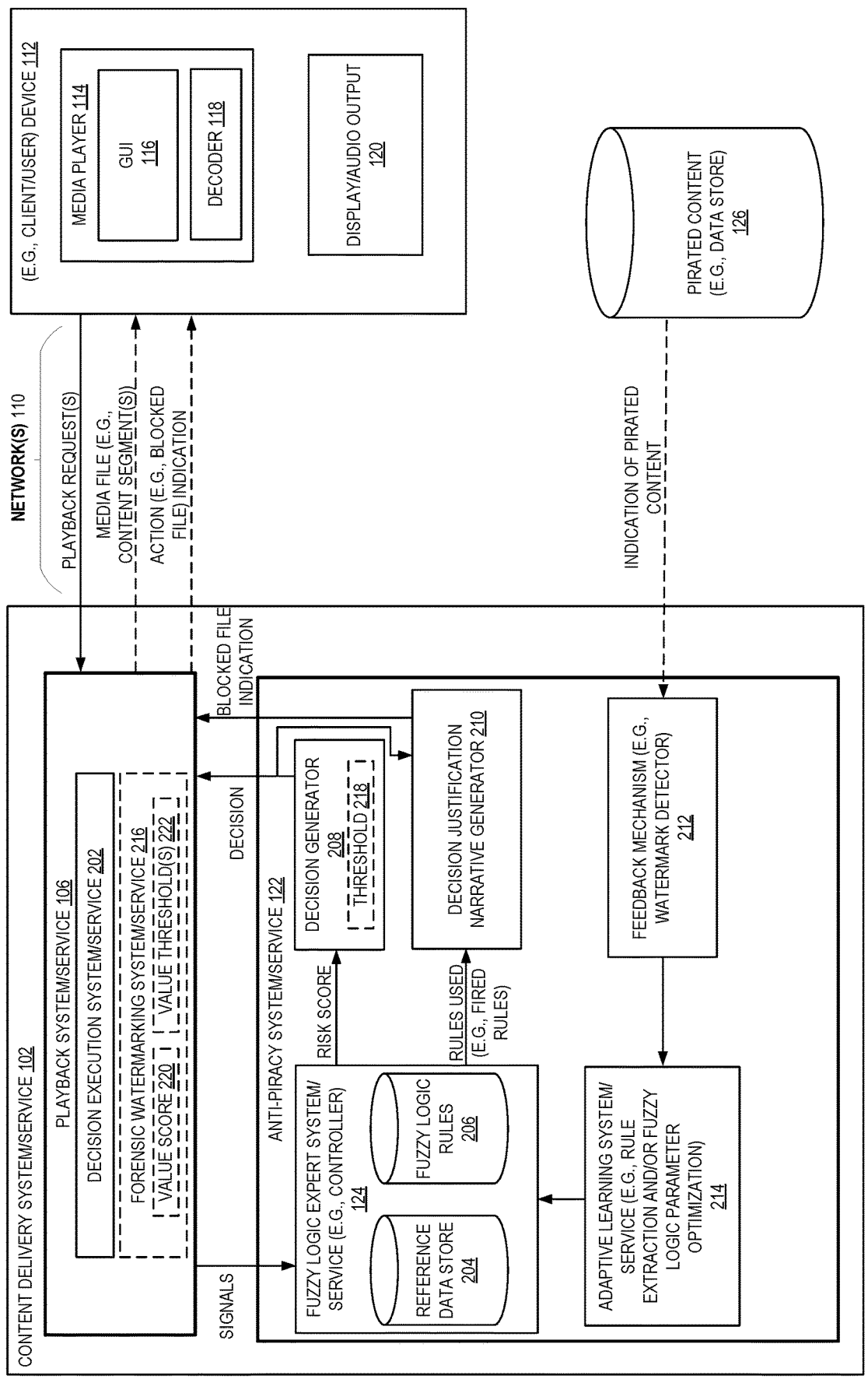
FIG. 2 is a diagram illustrating an anti-piracy system/service that includes a fuzzy logic expert system/service according to some examples.

FIG. 2 is a diagram illustrating an anti-piracy system/service 122 that includes a fuzzy logic expert system/service 124 (e.g., controller) according to some examples. In certain examples, playback system/service 106 receives a request for a file and that request is checked by anti-piracy system/service 122, e.g., to generate a decision. In certain examples, the decision execution system/service 202 is to carry out the decision, for example: to (i) send the file when the request is granted, (ii) not send the file when the request is denied, (e.g., and send a corresponding "blocked file" action indication to the device 112), and/or (iii) send a reduced quality version of the file when the request is granted but has a relative high risk score (e.g., and send a corresponding "reduced quality file is provided" action indication to the device 112).

In certain examples, content delivery system/service 102 is to send a request for a particular (e.g., media) file to anti-piracy system/service 122, e.g., to send one or more signals based on the request to the anti-piracy system/service 122. In certain examples, these signals are (or are converted to) fuzzy logic values, e.g., by fuzzy logic expert system/service 124 (e.g., controller). In certain examples, the fuzzy logic expert system/service 124 utilizes a reference data store 204 (e.g., indicating particulars for an account, including, but not limited to, past action from an account) and/or a set of fuzzy logic rules 206.

In certain examples, fuzzy logic expert system/service 124 is to output a risk score (e.g., and/or an indication of what rules 206 were used (e.g., "fired"). In certain examples, fuzzy logic expert system/service 124 is to output a risk score (e.g., single value) that is used by decision generator 208 to generate a decision for the file (e.g., playback) request. In certain examples, the decision is sent to the decision execution system/service 202 to carry out the decision. In certain examples, if the risk score exceeds (or does not exceed in another example) a threshold 218 (e.g., piracy risk score threshold), then the file is not provided (or a reduced quality version of the file is provided) to the device 112 and/or if the risk score does not exceed (or does exceed in another example) the threshold 218 (e.g., piracy risk score threshold), then the file is provided to the device 112.

In certain examples, a decision justification narrative generator 210 is to generate the indication, e.g., based on which rule(s) 206 were used (e.g., fired).

Although a media file is discussed in certain examples, it should be understood that examples herein may be utilized for other files, e.g., such that the anti-piracy system/service is used for authorization systems, payments systems, etc.

In certain examples, the fuzzy logic expert system/service 124 performs four operations: (i) fuzzification, (ii) inference, (iii) composition, and (iv) defuzzification (optionally).

Fuzzification

In certain examples, the fuzzification operation includes the membership functions (defined on the input variables) being applied to their actual values, e.g., to determine the degree of truth for each rule premise. In certain examples, the degree of truth for a rule's premise is referred to as its "alpha". In certain examples, if a rule's premise has a nonzero degree of truth (e.g., if the rule applies at all) then the rule is said to "fire".

Inference

In certain examples, the inference operation includes the truth value for the premise of each rule being computed, and applied to the conclusion part of each rule, e.g., where this results in one fuzzy subset to be assigned to each output variable for each rule. In one example, the inference is a minimum inference where the output membership function is clipped off at a height corresponding to the rule premise's computed degree of truth, e.g., a fuzzy logic AND operation. In another example, an inference is a product inference where the output membership function is scaled by the rule premise's computed degree of truth.

Composition

In certain example, the composition operation includes all of the fuzzy subsets assigned to each output variable being combined together to form a single fuzzy subset for each output variable. In one example, a composition is a maximum composition where the combined output fuzzy subset is constructed by taking the pointwise maximum over all of the fuzzy subsets assigned to the output variable by the inference rule. In another example, a sum composition constructs a combined output fuzzy subset by taking the pointwise sum over all of the fuzzy subsets assigned to the output variable by the inference rule. Note that this can result in truth values greater than one, so in certain examples, the sum composition is used when it will be followed by a defuzzification method.

Defuzzification

Sometimes it is useful to just examine the fuzzy subsets that are the result of the composition process, but other times, this "fuzzy value" is to be converted to a single number (e.g., a "crisp" value) by a defuzzification operation. In one example, a centroid defuzzification finds the variable value of the center of gravity of the membership function for the fuzzy value to generate the crisp value of the output variable. In another example, for a maximum defuzzification one of the variable values at which the fuzzy subset has its maximum truth value is chosen as the crisp value for the output variable.

In certain examples, fuzzy types for a request for a (e.g., media) file include the device age (e.g., with possible values that indicate a device is one of: very old, old, new, or very new), the device manufacturer, the (e.g., viewing) popularity of the file, type of device (e.g., with possible values that indicate a device is one of: smart phone, tablet, or desktop) and the requesting account piracy disposition (e.g. with possible values of low, medium, or high, generated separately using fuzzy rules). In certain examples, fuzzy rules may be generated to indicate a higher piracy risk score for sending a certain file to a certain type of device and a certain high piracy disposition account (e.g., device having a certain age and account having no prior retail purchases and/or purchases only with gift cards, etc.).

In certain examples, an expert knowledge gets translated into a (e.g., few) fuzzy variables of certain fuzzy types and a number of fuzzy rules 206 (e.g., discussed in further detail below). In certain examples, at this state, the fuzzy logic expert system/service 124 is static (e.g., as an artificial intelligence (AI) mechanism without any learning), e.g., it can risk score the playback requests (e.g., playback transactions sent to it by the player through the playback systems). In certain examples, the device 112 (e.g., player) sends playback requests to the playback system/service 106 (e.g., requesting one or more segments to play), the playback system/service 106 sends the playback request to the anti-piracy system/service 122 (e.g., fuzzy expert system/service 124), e.g., where it gets translated into a playback transaction and/or gets augmented by some reference data from data store 204 (e.g. account, past transactions, etc.). IN In certain examples, the request (e.g., or data based on the request) is then risk scored through the novel inference mechanism discussed herein. In certain examples, the risk score is communicated to the decision generator 208, e.g., where a decision is made based on adaptive and configurable business rules. In certain examples, this decision is enacted by the decision execution system/service 202 (e.g., the corresponding media file stream will either be blocked, temporarily reduced quality, or continued).

Certain examples herein utilize watermarking, e.g., via forensic watermarking system/service 216. In certain examples, the watermark is a digital marker covertly embedded in a file, e.g., a noise-tolerant signal such as audio, video, or image data.

In certain examples, if the request is permitted (e.g., decision generator 208 grants the request) (e.g., continued streaming is allowed), the file is forensically (e.g., covertly) watermarked, e.g., via forensic watermarking system/service 216. In certain examples, the forensic watermark is the feedback loop used to turn a static fuzzy inference system/service into an adaptive and learning system/service. In certain examples, if a decision has an impact on the customer (e.g., anything other than continue streaming as normal), a justification narrative can be generated by decision justification narrative generator 210 (e.g., if requested by a customer representative of the content delivery system/service 102) using the fired fuzzy rules 206 and the made decision. In certain examples, the forensic watermarking system/service 216 generates a value score 220 for a particular file (e.g., based on the popularity and/or current cost of the file), e.g., and compares that value score 220 to one or more value thresholds 222 to determine whether the watermark is to be included into the file, e.g., is the file of a high enough value to the content delivery provider to consume the resources to insert a watermark into the file. In certain examples, the forensic watermarking system/service 216 is to insert a (e.g., covert) watermark into the file that is sent to the user based on a value score for the file exceeding a value threshold and to not insert the (e.g., covert) watermark into the file that is sent to the user based on the value score for the file not exceeding the value threshold.

In certain examples, content delivery system/service 102 is to extract watermarks (e.g., watermark identifications(s)) by feedback mechanism 212 (e.g., watermark detector) from pirated copies, e.g., from pirated content 126 on the internet, etc. In certain examples, the forensic watermark(s) inserted by the content delivery system/service 102 is associated with a specific (e.g., playback) transaction(s) and may be used by adaptive learning system/service 214), e.g., to generate (e.g., extract) new fuzzy rules, update the parameters of the fuzzy expert system/service 124 (e.g., fuzzy inference engine 304 in FIG. 3), and/or optimize the fuzzy expert system/service 124. This adds dynamism and learning to implement an adaptive learning system in certain examples.

Figure 3:
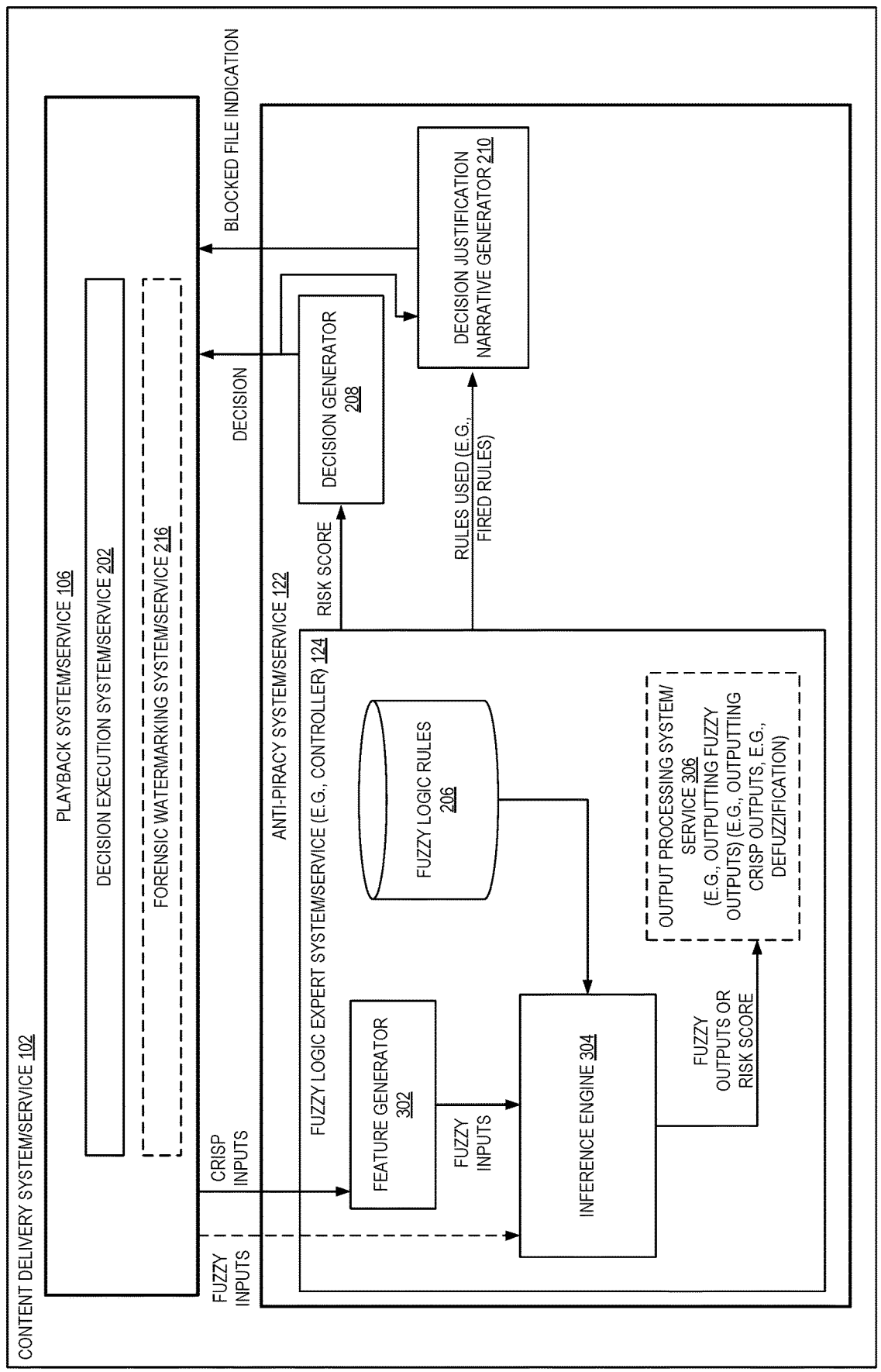
FIG. 3 is a diagram illustrating a fuzzy logic expert system/service that includes an inference engine according to some examples.

FIG. 3 is a diagram illustrating a fuzzy logic expert system/service 124 that includes an inference engine 304 according to some examples. In certain examples, the inference engine 304 applies the rules 206 to one or more fuzzy inputs (e.g., fuzzy values) to generate a corresponding output (e.g., fuzzy output(s) or risk score). In certain examples, a feature generator 302 is included, e.g., to perform fuzzification on a crisp value to generate a fuzzy value. In certain examples, an output processing system/service 306 is included, e.g., to perform defuzzification on a fuzzy value to generate a crisp value (e.g., risk score).

In certain examples, fuzzy-logic expert system/service 124 is a universal function approximation tool but, unlike a machine learning technique, is not a functional black box, e.g., it approximates the function based on the fuzzy rules that are knowledge-engineered from the domain experts. As a result, the generated relationship between the input fuzzy values and the output(s) are more transparent, and it is possible to generate narratives that explain why certain output has been generated using the fired fuzzy rules that have been triggered by a specific set of fuzzy value inputs. Certain users are desirous to understand why their request has not been fulfilled in an expected way, e.g., why was there request blocked or why was a reduced quality (e.g., resolution) file provided. In certain examples, fuzzy rules are also generally closer to the way humans think (due to their fuzzy nature), and as a result are relatively easier to extract using knowledge engineering techniques. In certain examples, a fuzzy expert system is a great AI solution when sufficient (e.g., huge amounts of) labelled data is not available but heuristics and fuzzy rules can be extracted from the domain experts.

Any other fuzzy expert systems/services have the following shortcomings that the other fuzzy expert systems/services disclosed herein overcome: (i) other fuzzy expert systems are monolithic systems that are hard to scale and extend, e.g., a small change to the input signals can introduce significant changes, (ii) as the number of input signals (fuzzy types and their associated fuzzy sets) increases, the number of rules grow exponentially in other fuzzy expert systems/services, (iii) as the number of input signals increases, it gets extremely difficult for (e.g., an expert) to write accurate rules for the other fuzzy expert systems/services, and (iv) other fuzzy expert systems/services are relatively static (e.g., with no automated learning mechanisms), e.g., the outputs of the other fuzzy expert systems/services are generated using the initial extracted rules with no further optimization, adaptation, learning, or evolution.

Fuzzy Logic Processing Units

To address the first three shortcomings (i) to (iii), the concept of a fuzzy logic processing unit (FPU) has been introduced. In certain examples, an FPU is the smallest unit of fuzzy processing.

Figure 4:
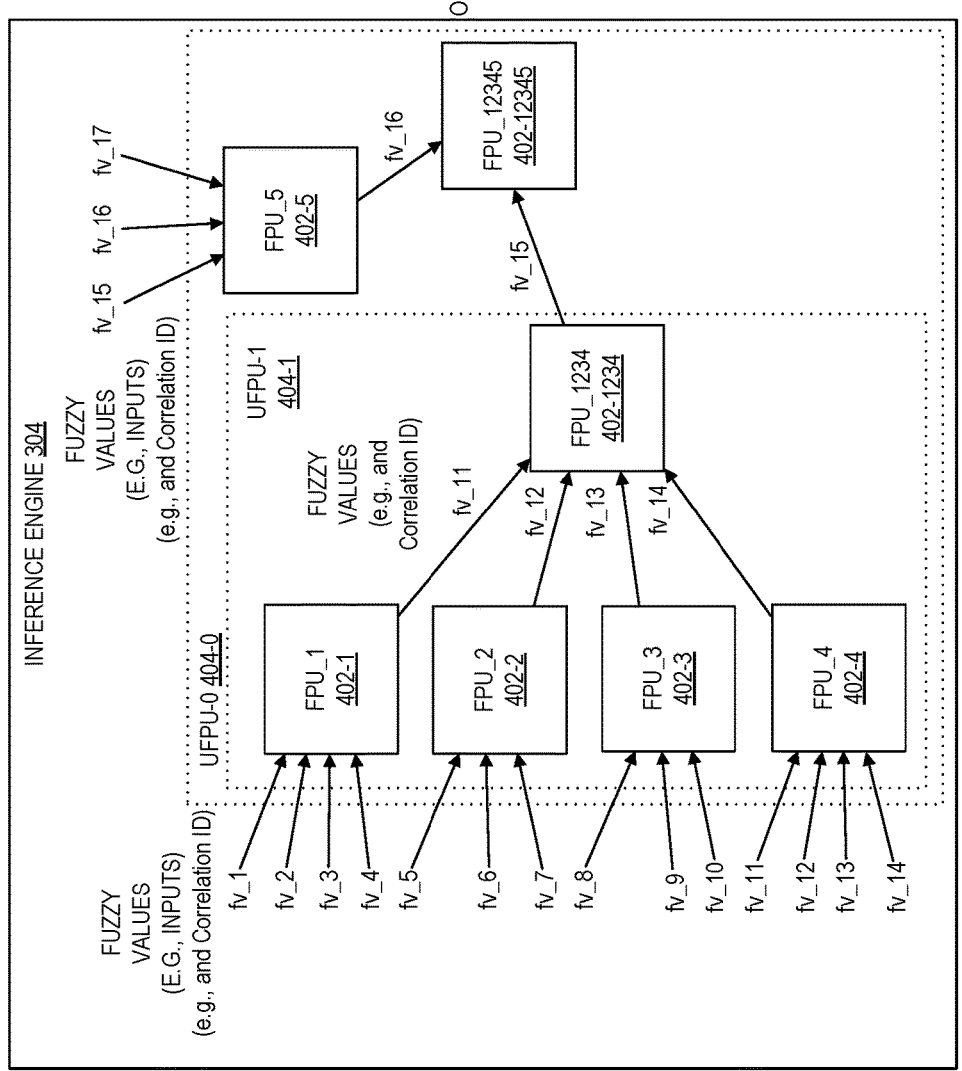
FIG. 4 is a diagram illustrating an architecture for an inference engine including a plurality of fuzzy logic processing units according to some examples.

FIG. 4 is a diagram illustrating an architecture for an inference engine 304 including a plurality of fuzzy logic processing units 402 and 404 according to some examples. In certain examples, an FPU has about 3, 4, or 5 input fuzzy values and calculates one fuzzy output. In FIG. 4, FPU_1 402-1 takes four fuzzy value inputs fv_1 to fv_4, applies the corresponding rule(s), and generates output fv_11, FPU_2 402-2 takes three fuzzy value inputs fv_5 to fv_7, applies the corresponding rule(s), and generates output fv_12, FPU_3 402-3 takes three fuzzy value inputs fv_8 to fv_10, applies the corresponding rule(s), and generates output fv_13, and FPU_4 402-4 takes four fuzzy value inputs fv_11 to fv_14, applies the corresponding rule(s), and generates output fv_14.

Thus, in certain examples, as the number of inputs are limited to a FPU, the required number of fuzzy rules are also limited, so it is easier for the rules to be understood and written. In certain examples, an FPU is a function that when it is given a few (fuzzy value) inputs, uses fuzzy logic and fuzzy inference mechanisms to generate a fuzzy value output.

In certain examples, the fractal (e.g., self-similar) nature of the FPU allows the FPU to be networked to create one or more "Uber" FPU (UFPU), e.g., composed FPUs. In certain examples, an uber FPU can calculate more and more number of input signals. In certain examples, any subset of the FPUs (more than 1 FPU) that gets its input signals from the external fuzzy values and generates one specific output is an UFPU. For instance, FIG. 4 includes two UFPUs: UFPU_0 404-0 and UFPU_1 404-1.

In FIG. 4, UFPU-1 404-1 further uses FPU_1234 402-1234 to generate output fv_15 from inputs fv_11 to fv_14 from FPU_1 402-1 to FPU_4 402-4, respectively. In FIG. 4, UFPU-0 404-0 further uses FPU_5 402-5 to generate output fv_I6 from inputs fv_I5 to fv_I7, and uses FPU_12345 402-12345 to generate the "output" from inputs fv_I5 and fv_I6 from FPU_1234 402-1234 and FPU_5 402-5, respectively. In certain examples, the "output" from UFPU-0 404-0 is a fuzzy value that is converted to a (e.g., crisp) risk score by output processing system/service 306.

The UFPU_0 404-0 could be replaced by one conventional monolithic Fuzzy Inference System, but using the example in FIG. 4, the following discusses why this new networked, layered approach is much more extensible and scalable from the monolithic approach:

Let's assume fv_1 to fv_17 and fv-output from FPU_12345 (the fuzzy type of the output before defuzzification) are fuzzy values of Fuzzy Types ft_1 to ft_17 and ft_o and each fuzzy type uniformly consists of three fuzzy sets. Using the monolithic approach would need $3^{17}=129,140,163$ rules (assuming that all rules are required).

But using the UFPUs would need:
$3^4+3^3+3^3+3^4+3^3+3^4+3^2$=only 333 rules. It also should be understood that adding a new fuzzy input to the monolithic approach would require an update to all the rules, but in the FPU approach, would use only an update to the FPU to which the new input is added.

It can also be easily seen that depending on the scalability and performance requirements FPUs can also be deployed as threads, processes, containers, virtual machines (VMs), or bare metal. In certain examples, an FPU network can be implemented as a distributed system. The implementation details are elaborated below in reference to FIG. 6, but in a very high level of abstraction, each FPU can be implemented as a worker agent that consumes input fuzzy values from a queue and produces the output and pushes it to another queue. Many redundant instances of the same FPU can exist depending on the performance requirements of the solution.

In certain examples, the depth of the FPU network (e.g., layers) and the nature of intermediary fuzzy types and fuzzy values (fv_I1 to fv_I5 in FIG. 4) have a significant impact on the performance and accuracy of the output compared to the monolithic approach.

As discussed further below, in certain examples a correlation identification (ID) for a particular transaction (e.g., for a particular request from a user) is included with the corresponding fuzzy values (e.g., and the correlation ID is to propagate along with the fuzzy values through the FPUs of the inference engine 304), e.g., such that the output(s) generated by the FPUs are tracked as belonging to that particular transaction.

Forensic (e.g., Subscriber-Level) Watermarking

In certain examples, forensic (e.g., subscriber-level) (e.g., user-level) watermarking (FWM) system/service 216 plays one or more roles: (i) as a data source for a fuzzy logic expert system/service and/or (ii) as a consumer of the (e.g., privacy risk) scores generated by a fuzzy logic expert system/service. In certain examples, as a data source, FWM provides high confidence data on piracy acts committed by certain accounts on some pieces of content (e.g., media files) augmented by auxiliary data (such as device ID., etc.) from reference data store 204. For example, with a fuzzy logic expert system/service determining that a particular account is committing piracy acts (e.g., the unauthorized distribution of a media file) on a file by detecting that a watermark, included for that account into the file, was found in pirated content 126. In certain examples, this can be used to retroactively label transactions and/or used for (e.g., automated) fuzzy rules extraction as discussed herein. In certain examples, as a consumer of scores generated by a fuzzy logic expert system/service, FWM system/service 216 makes decisions (e.g., to send content or otherwise) based on the trustworthiness of a device (e.g., and/or account) and/or based on the value (e.g., value score 220) of the content itself. In certain examples, this is used to allow the FWM system/service 216 to choose whether to deliver a watermarked file (e.g., watermarked session) to a customer (e.g., in real-time), or, if the value is below a value threshold 222, it can choose not to spend the additional resources encoding the content with a watermark.

Evolution, Learning and Optimization

Unlike fuzzy expert systems which remain static once designed, certain examples herein are directed to a fuzzy logic expert system/service with adaptive learning. In certain examples, using data from forensic (e.g., subscriber-level instead of content delivery level) watermarking system/service 216 as a (e.g., continuous) feedback mechanism allows a fuzzy logic expert system/service to dynamically update the core building blocks thereof. In certain examples, these building blocks include the fuzzy rules as well as other knowledge-engineered parameters such as, but not limited to, the membership functions of the fuzzy sets and/or defuzzification methods. In certain examples, with forensic (e.g., subscriber-level) watermarking system/service 216 serving as a real-time source (e.g., of ground truth) for piracy transactions, the fuzzy logic expert system/service will continuously learn the optimal selection and combination of building blocks to generate the most accurate risk score(s) possible, e.g., based on the most up-to-date information available. This dynamic learning process is critical for a domain such as piracy, where threat vectors are continuously subject to change as attackers also adjust and refine their approaches.

In certain examples, this adaptive learning for a fuzzy logic expert system/service applies a genetic algorithm (GA) fitness function to measure the fuzzy logic expert system's/service's performance for the purpose of optimization. In certain examples, this consists of two pareto-optimal objectives: (1) maximizing the average precision (AP), which refers to the weighted means of precision at each threshold in a precision-recall curve, with recall used as the weight, and (2) minimizing the time to decision (TTD). In certain examples, fuzzy rules are extracted by designing novel extensions to unsupervised clustering algorithms.

Figure 5:
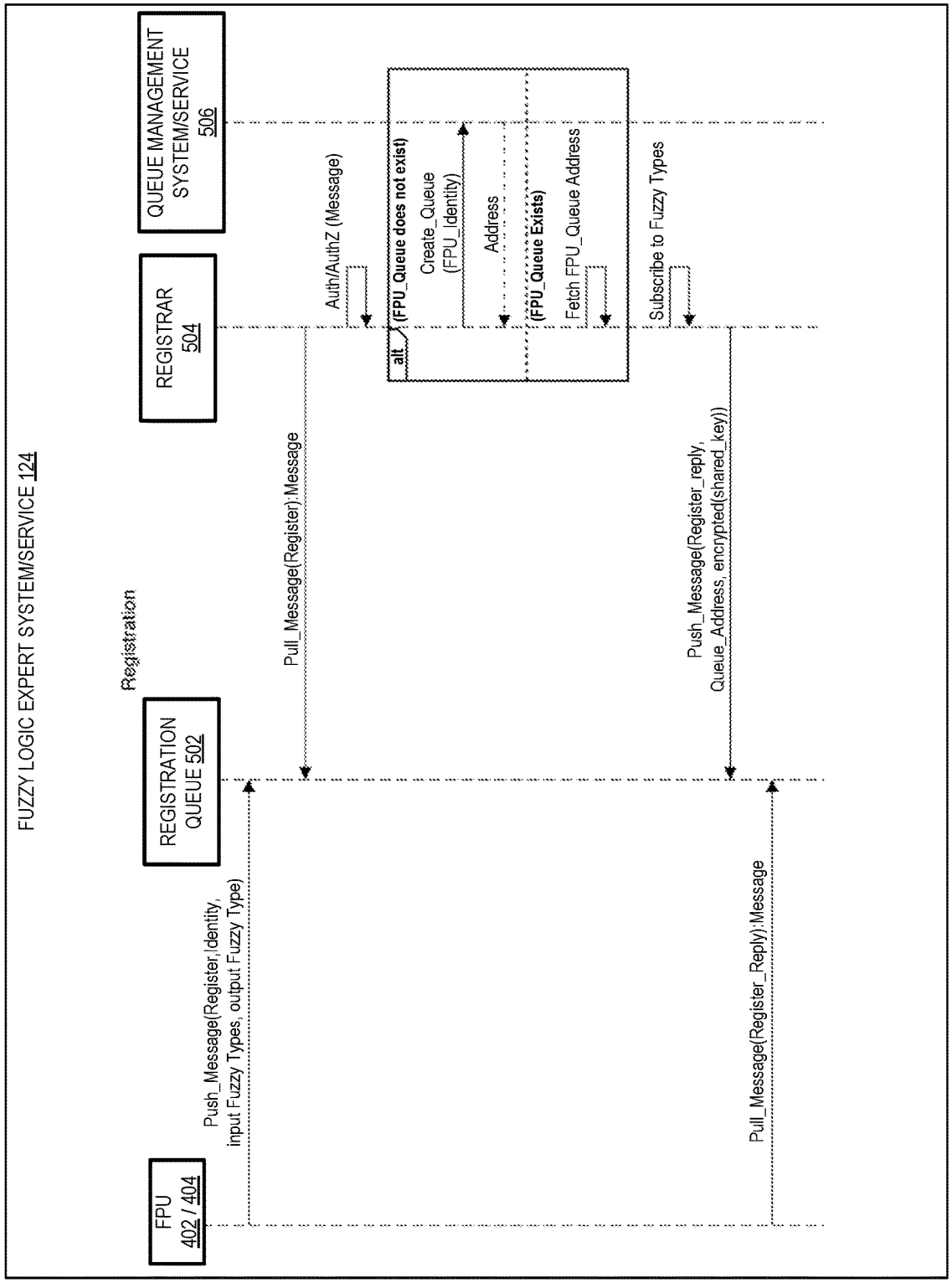
FIG. 5 is a swimlane diagram illustrating registration operations for a fuzzy logic processing unit according to some examples.
Figure 6:
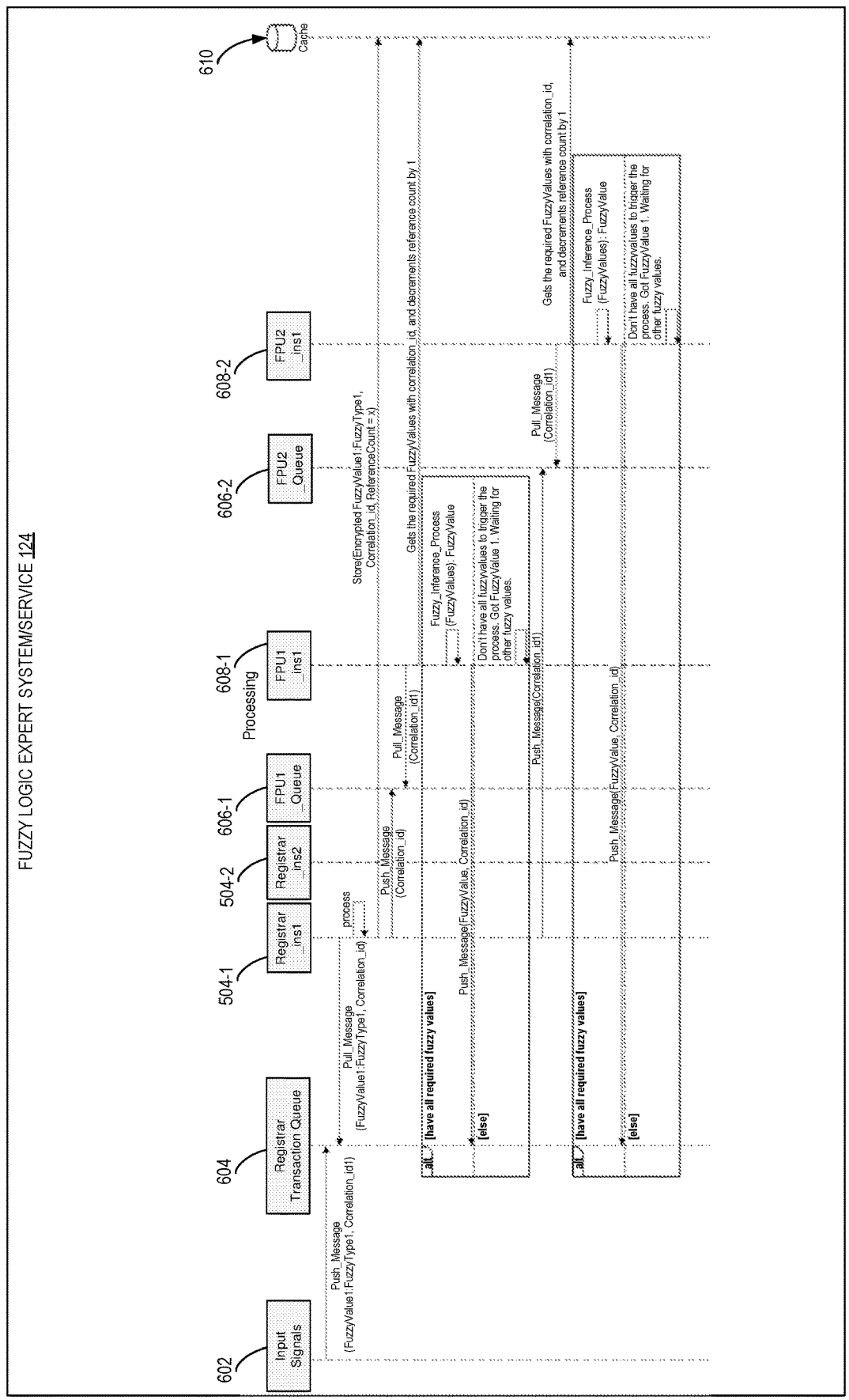
FIG. 6 is a swimlane diagram illustrating processing operations for a plurality of fuzzy logic processing units according to some examples.

Turning to FIGS. 5-6, example registration and processing operations are discussed.

FIG. 5 is a swimlane diagram illustrating registration operations for a fuzzy logic processing unit according to some examples. In certain examples, registrar 504 is an entity (e.g., of fuzzy logic expert system/service 124) that is responsible for authentication of any FPUs that are to join the FPU network and provides access control. In certain examples, registrar 504 implements a publication/subscription architecture by publishing the fuzzy values (e.g., input values corresponding to a request for a file) to the subscribed FPUs. In certain examples, registrar 504 has an address known to the other components utilized (e.g., FPUs). In certain examples, when an FPU (e.g., one or more (e.g., all) of FPUs 402 and UFPUs 404 in FIG. 4) are to join a network, the FPU sends a message to the registrar 504 (e.g., push a message to the registration queue 502 from which the registrar 504 workers pop messages), e.g., that includes its identity and the fuzzy types that it consumes and/or the fuzzy type that it produces (e.g., where the FPU implements a fuzzy function that consumes fuzzy values of certain fuzzy types and produces a fuzzy value of a certain fuzzy type). In certain examples, the registrar 504 authenticates the FPU and assures it can have access to the requested fuzzy types and is allowed to produce the requested fuzzy type according to certain (e.g., predefined) access rules. In certain examples, if successfully authenticated and access permissions granted, the registrar 504 creates (e.g., via queue management system/service 506) a queue (e.g., FPU queue) for that FPU, e.g., and shares the FPU encryption key and the queue address with it and subscribes the FPU to those fuzzy types (e.g., if any fuzzy value of the fuzzy type is pushed to the registrar 504, it will in turn push them to the subscribed FPUs by encrypting them using the FPU key and putting them in their FPU queues).

FIG. 6 is a swimlane diagram illustrating processing operations for a plurality of fuzzy logic processing units according to some examples. In certain examples, input signals 602 (e.g., input fuzzy values) have a correlation ID that gets propagated through the network (e.g., the network shown in FIG. 4) and shows the values that are related to one transaction (e.g., one request from a user). In certain examples, registrar 504 is an entity (e.g., of fuzzy logic expert system/service 124) that, as fuzzy values are pushed to the registrar transaction queue 604, they are processed by the registrar 504 (e.g., first instance 504-1 of registrar, e.g., and not second instance 504-2 of registrar), for example, where their correlation ID is pushed to the appropriate FPU Message Queues (e.g., FPU_1 queue 606-1 and FPU_2 queue 606-2 in FIG. 6) according to their subscriptions and the fuzzy values to a shared cache 610 (e.g., the fuzzy values are encrypted using the fuzzy type keys and only the FPUs authorized (e.g., FPU_1 608-1 and FPU_2 608-2 in FIG. 6, with respective queues) to have access to those fuzzy types and have the keys to decrypt and use them). In certain examples, FPUs (FPU instances) are monitoring their queue (e.g., FPU_1 queue 606-1 for FPU 608-1 and FPU_2 queue 606-2 for FPU 608-2 in FIG. 6), e.g., and as soon as they receive a correlation ID, they start pulling from the cache 610 for all the (e.g., co-related) fuzzy values they are to source. In certain examples, as soon as an FPU receives all the input (e.g., co-related) fuzzy values, the FPU instance processes them via the fuzzy inference engine (e.g., mechanism) and pushes the result back to the registrar transaction queue 604. In certain examples, this newly generated fuzzy value is either pushed to other FPUs in the next layer and/or to an endpoint worker (e.g., output processing system/service 306). In certain examples, endpoint workers are a different type of entity that can also subscribe to certain fuzzy types, e.g., when the registrar receives fuzzy values of that fuzzy type, it will push those values to the endpoint(s). In certain examples, the endpoint(s) can log, display, transfer, etc. the fuzzy values.

In certain examples, the registrar 504 (e.g., garbage collector thereof) deletes stale fuzzy values from the cache 610. In certain examples, the registrar 504 knows the number of FPUs that have access to a certain fuzzy value, e.g., when the registrar 504 pushes the fuzzy value to the cache 610, the data construct includes a reference count (e.g., number of FPUs which have access to the fuzzy value), and when each FPU instance reads the fuzzy value it reduces the reference count by 1, so that when the reference count gets to zero, the registrar (e.g., the garbage collector thereof) removes it from the cache, e.g., to prevent data storage burst).

FIG. 7 is a diagram illustrating a graphical user interface 116 for an indication to a user that explains an action performed by an anti-piracy system/service according to some examples. Depicted graphical user interface 116 includes a field 702 that is customizable with text to indicate to the user (e.g., requester of a file from a content delivery system/service) why an action was taken by the content delivery system/service, for example, that the requested access was blocked, the access was allowed, the file provided at a reduced quality, etc.). In certain examples, this text (or an indication of this text) is generated by decision justification narrative generator 210. Depicted graphical user interface 116 includes a field 704A-704B for (e.g., each) a rule of a fuzzy logic rules that was used (e.g., "fired") to cause the action explained in field 702, for example, with field 704-A for (e.g., fired) rule 1 up to field 704B for (e.g., fired) rule "X" (e.g., where X is any positive integer greater than one). In certain examples, field 708A is included with an explanation of why the action (e.g., the requested access was blocked, the access was allowed, the file provided at a reduced quality, etc.) was undertaken under rule 1 and field 708B is included with an explanation of why the action (e.g., the requested access was blocked, the access was allowed, the file provided at a reduced quality, etc.) was undertaken under rule "X".

Figure 8:
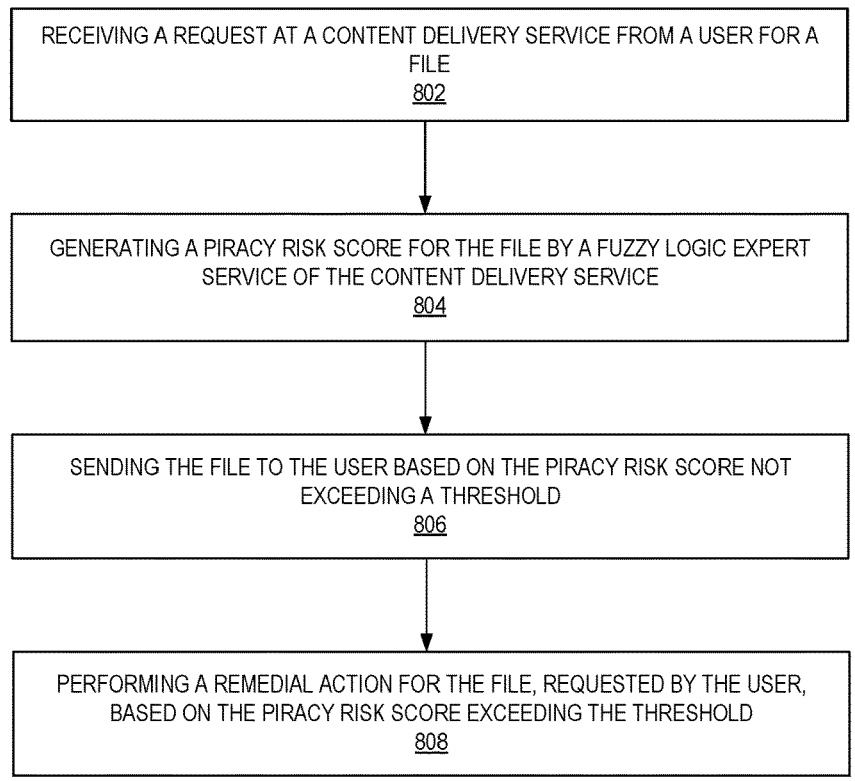
FIG. 8 is a flow diagram illustrating operations of a method for utilizing a fuzzy logic expert service generating a piracy risk score for a requested file, and taking corresponding action based on the piracy risk score according to some examples.

FIG. 8 is a flow diagram illustrating operations 800 of a method for utilizing a fuzzy logic expert service generating a piracy risk score for a requested file, and taking corresponding action based on the piracy risk score according to some examples.

Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 800 are performed by content delivery system/service of the other figures.

The operations 800 include, at block 802, receiving a request at a content delivery service from a user for a file. The operations 800 further include, at block 804, generating a piracy risk score for the file by a fuzzy logic expert service of the content delivery service. The operations 800 further include, at block 806, sending the file to the user based on the piracy risk score not exceeding a threshold. The operations 800 further include, at block 808, performing a remedial action for the file, requested by the user, based on the piracy risk score exceeding the threshold.

Exemplary environments, systems, etc. that the above may be used in are detailed below.

At least some examples of the disclosed technologies can be described in view of the following examples:

Example 1. A computer-implemented method comprising:
receiving a request at a content delivery service from a user for a media file;
generating a piracy risk score for the media file by a fuzzy logic expert service of the content delivery service;
sending the media file to the user based on the piracy risk score not exceeding a threshold; and
blocking the sending of the media file to the user based on the piracy risk score exceeding the threshold.

Example 2. The computer-implemented method of example 1, wherein the generating comprises inputting a plurality of fuzzy values based on the media file into a first plurality of fuzzy logic processing units that utilize a first proper subset set of fuzzy logic rules of the fuzzy logic expert service to generate fuzzy value outputs, and inputting the fuzzy value outputs of the first plurality of fuzzy logic processing units into another fuzzy logic processing unit that utilizes a second proper subset set of fuzzy logic rules of the fuzzy logic expert service to generate the piracy risk score.

Example 3. The computer-implemented method of example 1, further comprising:
  inserting a covert watermark into the media file that is sent to the user based on the piracy risk score not exceeding the threshold;
  scanning for the covert watermark in a data store external from the content delivery service and external from the user to detect a possible pirated version of the media file; and
  triggering generation of a fuzzy logic rule of the fuzzy logic expert service based on detection of the covert watermark.

Example 4. A computer-implemented method comprising:
  receiving a request at a content delivery service from a user for a file;
  generating a piracy risk score for the file by a fuzzy logic expert service of the content delivery service;
  sending the file to the user based on the piracy risk score not exceeding a threshold; and
  performing a remedial action for the file, requested by the user, based on the piracy risk score exceeding the threshold.

Example 5. The computer-implemented method of example 4, wherein the generating comprises inputting a plurality of fuzzy values based on the file into a first plurality of fuzzy logic processing units that utilize a first proper subset set of fuzzy logic rules of the fuzzy logic expert service to generate fuzzy value outputs, and inputting the fuzzy value outputs of the first plurality of fuzzy logic processing units into another fuzzy logic processing unit that utilizes a second proper subset set of fuzzy logic rules of the fuzzy logic expert service to generate the piracy risk score.

Example 6. The computer-implemented method of example 5, further comprising:
  including a correlation identification value, that corresponds to the file, with the plurality of fuzzy values;
  propagating the correlation identification values with the fuzzy value outputs into the first plurality of fuzzy logic processing units;
  propagating the correlation identification values with the fuzzy value outputs into the another fuzzy logic processing unit; and
  determining that the piracy risk score generated by the another fuzzy logic processing unit is for the file of a plurality of files based on at least one of the correlation identification values provided, with the fuzzy value outputs, to the another fuzzy logic processing unit.

Example 7. The computer-implemented method of example 4, further comprising inserting a covert watermark into the file that is sent to the user based on the piracy risk score not exceeding the threshold.

Example 8. The computer-implemented method of example 7, wherein the inserting the covert watermark into the file that is sent to the user is based on the piracy risk score not exceeding the threshold and a value score for the file exceeding a value threshold.

Example 9. The computer-implemented method of example 8, further comprising not inserting the covert watermark into the file that is sent to the user based on the piracy risk score not exceeding the threshold, and the value score for the file not exceeding the value threshold.

Example 10. The computer-implemented method of example 7, further comprising:
  scanning for the covert watermark in a data store external from the content delivery service and external from the user to detect a possible pirated version of the file; and
  triggering generation of a fuzzy logic rule of the fuzzy logic expert service based on detection of the covert watermark.

Example 11. The computer-implemented method of example 4, wherein the performing the remedial action for the file, requested by the user, based on the piracy risk score exceeding the threshold comprises blocking the sending of the file to the user.

Example 12. The computer-implemented method of example 11, further comprising sending an indication to the user that the file is blocked from being sent to the user, and an identification of at least one rule of a set of fuzzy logic rules of the fuzzy logic expert service that triggered the blocking.

Example 13. The computer-implemented method of example 4, wherein the performing the remedial action for the file, requested by the user, based on the piracy risk score exceeding the threshold comprises sending a reduced quality version of the file to the user.

Example 14. The computer-implemented method of example 13, further comprising sending an indication to the user that the file is the reduced quality version, and an identification of at least one rule of a set of fuzzy logic rules of the fuzzy logic expert service that triggered sending the reduced quality version.

Example 15. A system comprising:
  one or more electronic devices to implement a storage service to store a file; and
  one or more electronic devices to implement a content delivery service, the content delivery service including instructions that upon execution cause the content delivery service to perform a method comprising:
    receiving a request at the content delivery service from a user for the file,
    generating a piracy risk score for the file by a fuzzy logic expert service of the content delivery service,
    sending the file to the user based on the piracy risk score not exceeding a threshold, and
    performing a remedial action for the file, requested by the user, based on the piracy risk score exceeding the threshold.

Example 16. The system of example 15, wherein the generating of the method comprises inputting a plurality of fuzzy values based on the file into a first plurality of fuzzy logic processing units that utilize a first proper subset set of fuzzy logic rules of the fuzzy logic expert service to generate fuzzy value outputs, and inputting the fuzzy value outputs of the first plurality of fuzzy logic processing units into another fuzzy logic processing unit that utilizes a second proper subset set of fuzzy logic rules of the fuzzy logic expert service to generate the piracy risk score.

Example 17. The system of example 16, wherein the instructions upon execution cause the content delivery service to perform the method further comprising:
  including a correlation identification value, that corresponds to the file, with the plurality of fuzzy values;
  propagating the correlation identification values with the fuzzy value outputs into the first plurality of fuzzy logic processing units;
  propagating the correlation identification values with the fuzzy value outputs into the another fuzzy logic processing unit; and
  determining that the piracy risk score generated by the another fuzzy logic processing unit is for the file of a plurality of files based on at least one of the correlation identification values provided, with the fuzzy value outputs, to the another fuzzy logic processing unit.

Example 18. The system of example 15, wherein the instructions upon execution cause the content delivery service to perform the method further comprising:
inserting a covert watermark into the file that is sent to the user based on the piracy risk score not exceeding the threshold;
scanning for the covert watermark in a data store external from the content delivery service and external from the user to detect a possible pirated version of the file; and
triggering generation of a fuzzy logic rule of the fuzzy logic expert service based on detection of the covert watermark.

Example 19. The system of example 15, wherein the performing the remedial action for the file, requested by the user, based on the piracy risk score exceeding the threshold comprises blocking the sending of the file to the user.

Example 20. The system of example 15, wherein the performing the remedial action for the file, requested by the user, based on the piracy risk score exceeding the threshold comprises sending a reduced quality version of the file to the user.

Figure 9:
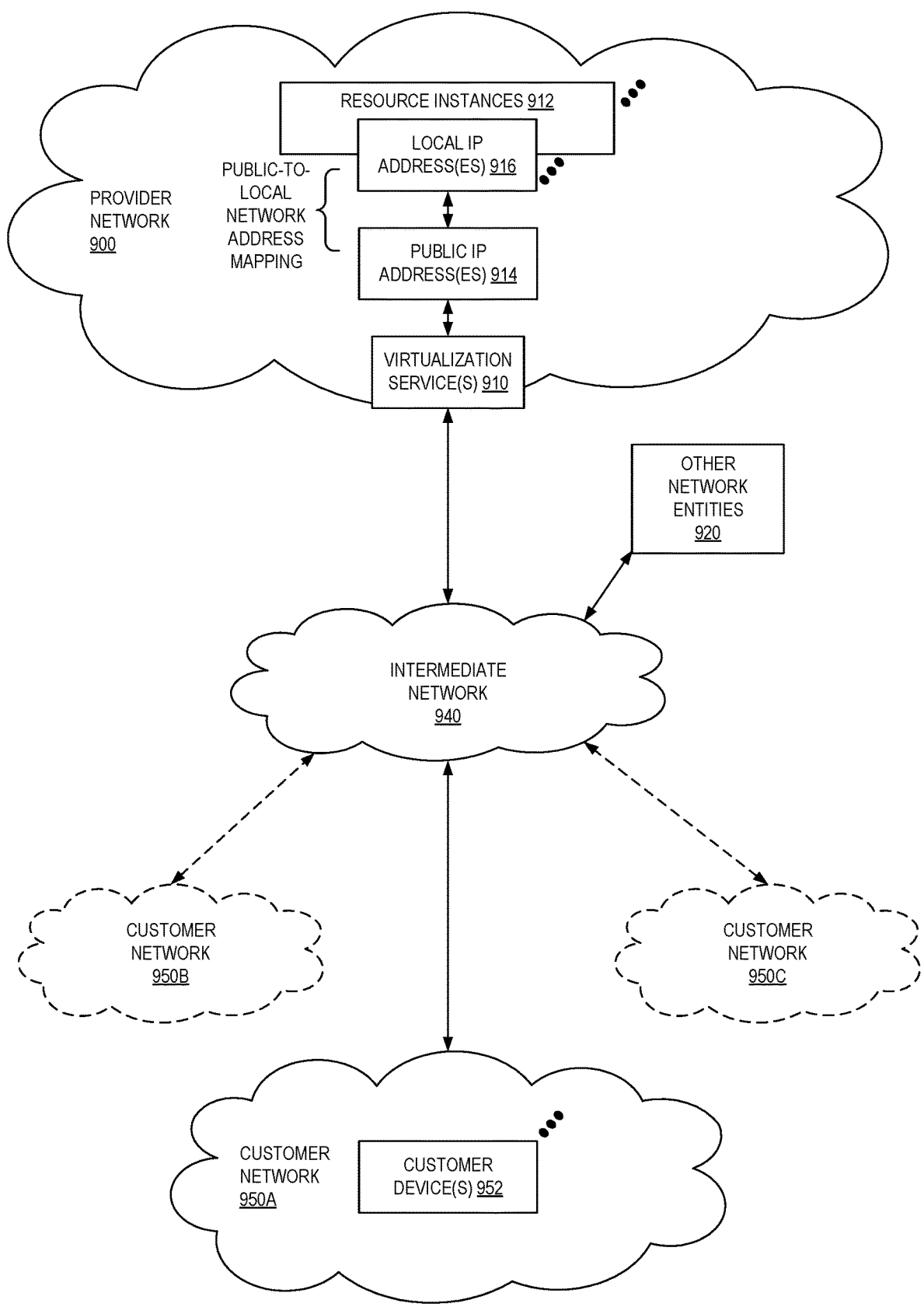
FIG. 9 illustrates an example provider network environment according to some examples.

FIG. 9 illustrates an example provider network (or "service provider system") environment according to some examples. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some examples, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
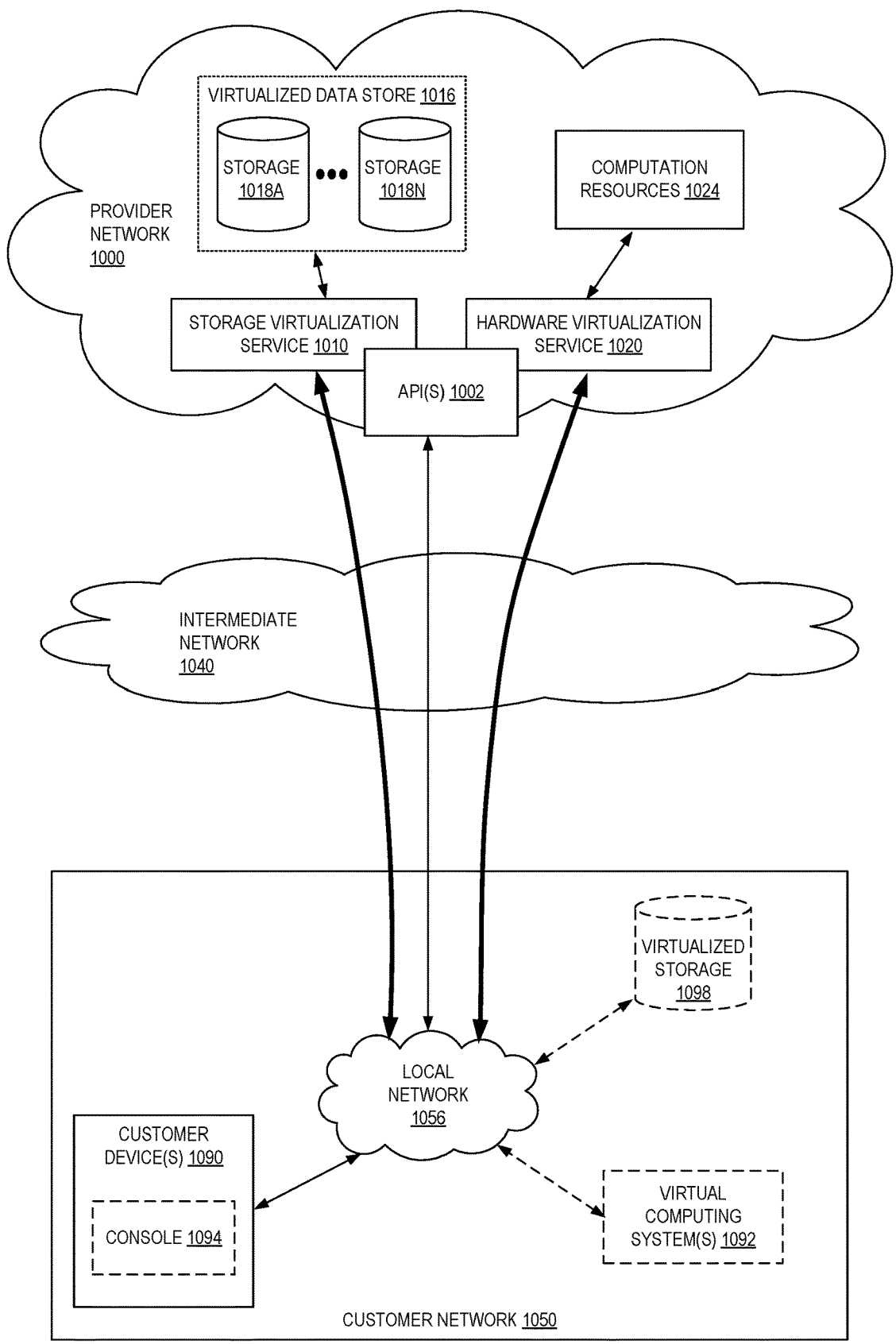
FIG. 10 is a block diagram of an example provider network that provides a storage service and a hardware virtualization service to customers according to some examples.

FIG. 10 is a block diagram of an example provider network that provides a storage service and a hardware virtualization service to customers, according to some examples. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some examples, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some examples, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some examples, a virtualized data store gateway (not shown) may be provided at the customer network 1050 that may locally cache at least some data, for example frequently accessed or critical data, and that may communicate with storage service 1010 via one or more communications channels to upload new or modified data from a local cache so that the primary store of data (virtualized data store 1016) is maintained. In some examples, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative System

Figure 11:
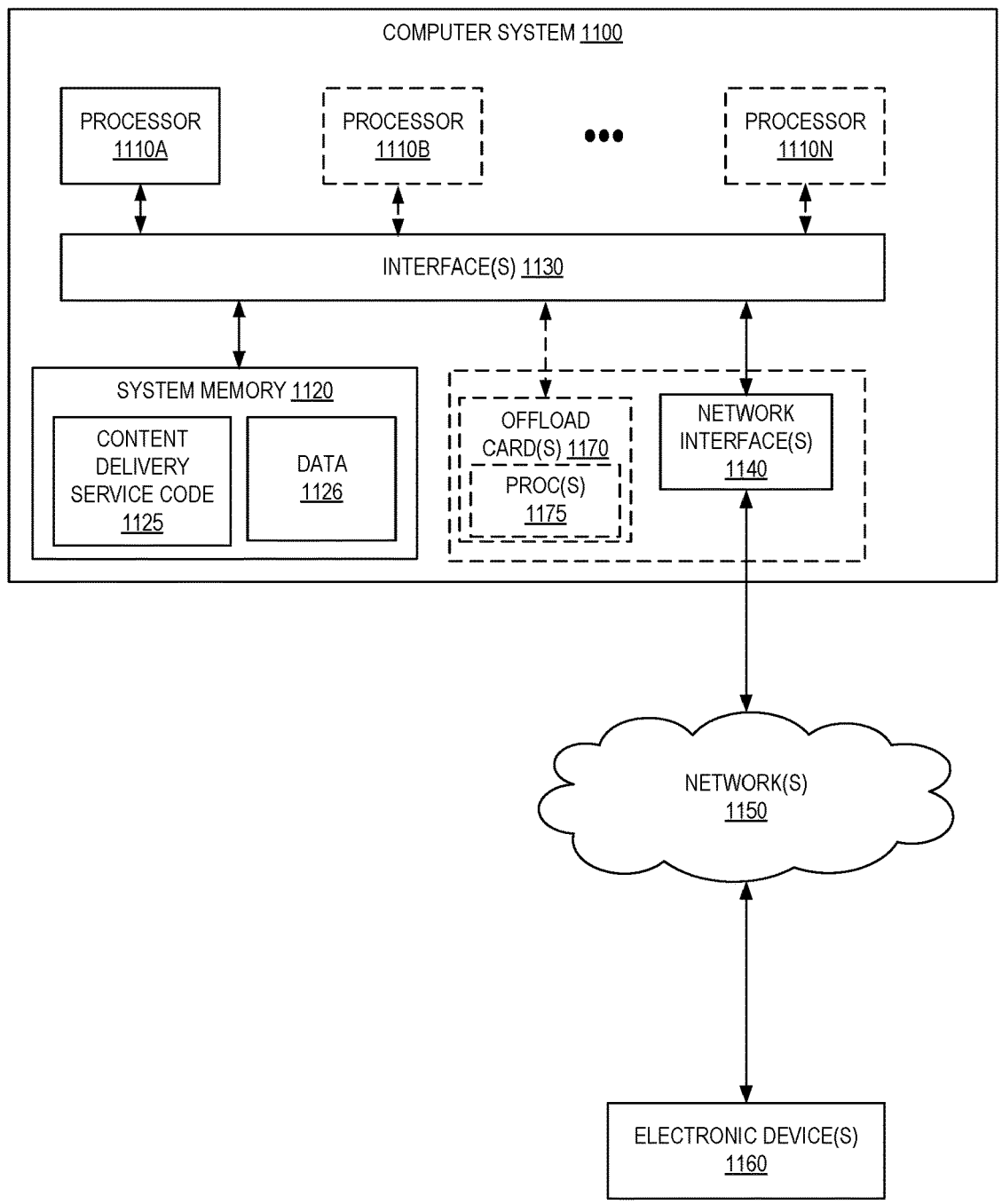
FIG. 11 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1100 illustrated in FIG. 11. In the illustrated example, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various examples a computer system 1100 may include one computing device or any number of computing devices configured to work together as a single computer system 1100.

In various examples, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various examples, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various examples, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1120 as content delivery service code 1125 (e.g., and/or anti-piracy service code) and data 1126.

In one example, I/O interface 1130 may be configured to coordinate I/O traffic between processor 1110, system memory 1120, and any peripheral devices in the device, including network interface 1140 or other peripheral interfaces. In some examples, I/O interface 1130 may perform any necessary protocol, timing, or other data transformations to convert data signals from one component (e.g., system memory 1120) into a format suitable for use by another component (e.g., processor 1110). In some examples, I/O interface 1130 may include support for devices attached through various types of peripheral buses, such as a variant of the Peripheral Component Interconnect (PCI) bus standard or the Universal Serial Bus (USB) standard, for example. In some examples, the function of I/O interface 1130 may be split into two or more separate components, such as a north bridge and a south bridge, for example. Also, in some examples some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various examples, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some examples the offload card(s) 1170 can perform compute instance management operations such as pausing and/or un-pausing compute instances, launching and/or terminating compute instances, performing memory transfer/copying operations, etc. These management operations may, in some examples, be performed by the offload card(s) 1170 in coordination with a hypervisor (e.g., upon a request from a hypervisor) that is executed by the other processors 1110A-1110N of the computer system 1100. However, in some examples the virtualization manager implemented by the offload card(s) 1170 can accommodate requests from other entities (e.g., from compute instances themselves), and may not coordinate with (or service) any separate hypervisor.

In some examples, system memory 1120 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Figure 12:
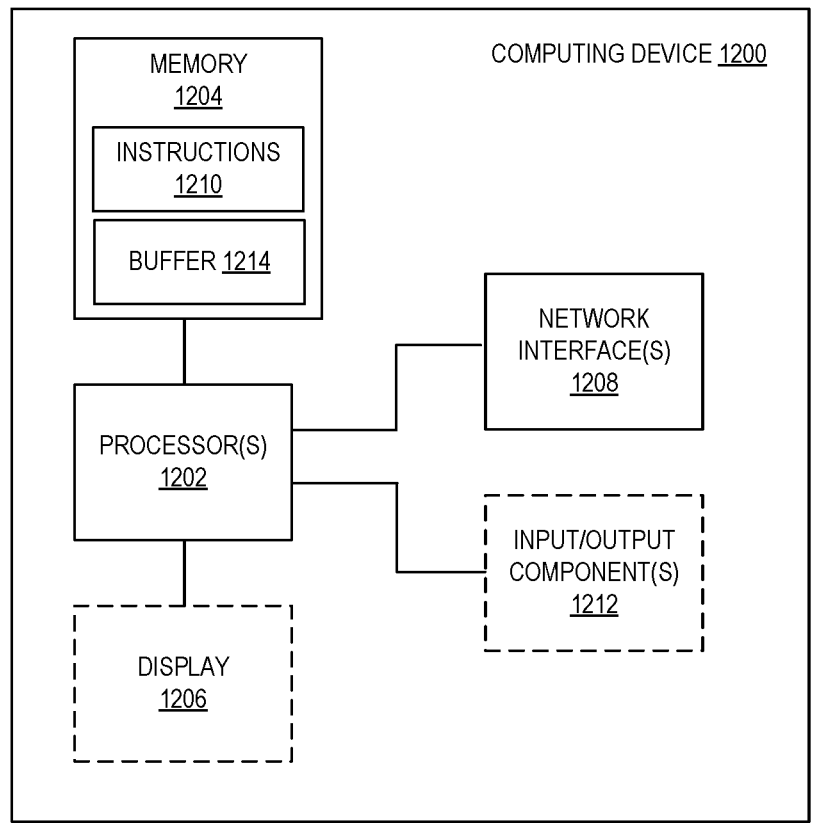
FIG. 12 illustrates a logical arrangement of a set of general components of an exemplary computing device that can be utilized in accordance with various examples.

FIG. 12 illustrates a logical arrangement of a set of general components of an example computing device 1200. Generally, a computing device 1200 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1202 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1204) to store code (for example, instructions 1210, e.g., which implement an anomaly detector as disclosed herein) and/or attribute data 1214 (e.g., generated by computing device 1200 for transmittal to an anomaly detector), and a set of one or more wired or wireless network interfaces 1208 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1204) of a given electronic device typically stores code (e.g., instructions 1210) for execution on the set of one or more processors 1202 of that electronic device. One or more parts of various examples may be implemented using different combinations of software, firmware, and/or hardware.

A computing device 1200 can include some type of display element 1206, such as a touch screen or liquid crystal display (LCD), although many devices such as portable media players might convey information via other means, such as through audio speakers, and other types of devices such as server end stations may not have a display element 1206 at all. As discussed, some computing devices used in some examples include at least one input and/or output component(s) 1212 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 13:
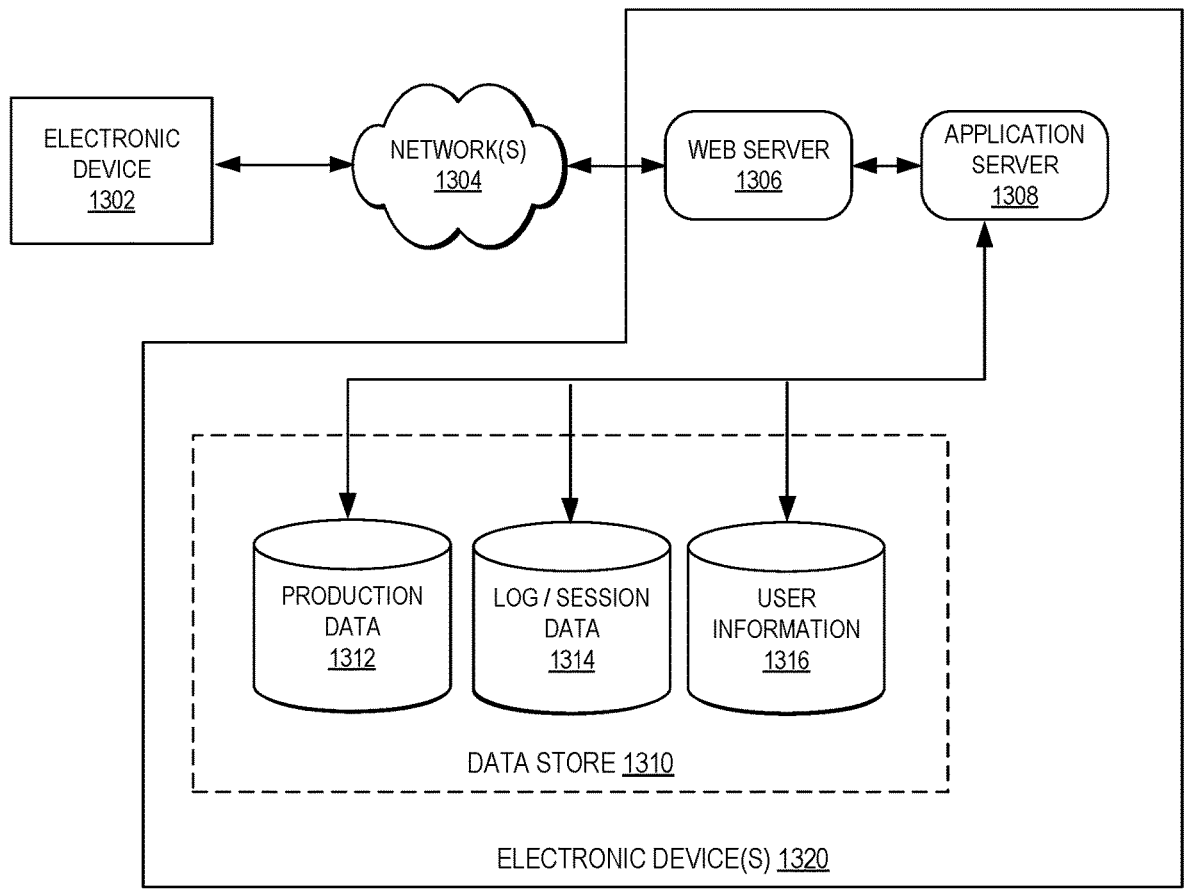
FIG. 13 illustrates an example of an environment for implementing aspects in accordance with various examples.

As discussed, different approaches can be implemented in various environments in accordance with the described examples. For example, FIG. 13 illustrates an example of an environment 1300 for implementing aspects in accordance with various examples. For example, in some examples messages are HyperText Transfer Protocol (HTTP) requests that are received by a web server (e.g., web server 1306), and the users, via electronic devices, may interact with the provider network via a web portal provided via the web server 1306 and application server 1308. As will be appreciated, although a web-based environment is used for purposes of explanation, different environments may be used, as appropriate, to implement various examples. The system includes an electronic client device 1302, which may also be referred to as a client device and can be any appropriate device operable to send and receive requests, messages or information over an appropriate network 1304 and convey information back to a user of the device 1302. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1304 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1304 includes the Internet, as the environment includes a web server 1306 for receiving requests and serving content in response thereto, although for other networks an alternative device serving a similar purpose could be used, as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device 1302 and handling a majority of the data access and business logic for an application. The application server 1308 provides access control services in cooperation with the data store 1310 and is able to generate content such as text, graphics, audio, video, etc., to be transferred to the client device 1302, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1302 and the application server 1308, can be handled by the web server 1306. It should be understood that the web server 1306 and application server 1308 are not required and are merely example components, as structured code discussed herein can be executed on any appropriate device or host machine as discussed elsewhere herein.

The data store 1310 can include several separate data tables, databases, or other data storage mechanisms and media for storing data relating to a particular aspect. For example, the data store illustrated includes mechanisms for storing production data 1312 and user information 1316, which can be used to serve content for the production side. The data store 1310 also is shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update, or otherwise process data in response thereto. In one example, a user might submit a search request for a certain type of item. In this case, the data store 1310 might access the user information 1316 to verify the identity of the user and can access a production data 1312 to obtain information about items of that type. The information can then be returned to the user, such as in a listing of results on a web page that the user is able to view via a browser on the user device 1302. Information for a particular item of interest can be viewed in a dedicated page or window of the browser.

The web server 1306, application server 1308, and/or data store 1310 may be implemented by one or more electronic devices 1320, which can also be referred to as electronic server devices or server end stations, and may or may not be located in different geographic locations. Each of the one or more electronic devices 1320 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 1018A-1018N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request at a content delivery service from a user for a media file;
generating a piracy risk score with greater than two possible values for the media file by a fuzzy logic expert service of the content delivery service;
inserting a covert watermark into the media file and sending the media file with the covert watermark to the user based on the piracy risk score with greater than two possible values not exceeding a threshold;
blocking the sending of the media file to the user based on the piracy risk score with greater than two possible values exceeding the threshold;
scanning for the covert watermark in a data store external from the content delivery service and external from the user to detect a possible pirated version of the media file; and
triggering generation of a fuzzy logic rule of the fuzzy logic expert service based on detection of the covert watermark in the data store external from the content delivery service and external from the user.

2. The computer-implemented method of claim 1, wherein the generating comprises inputting a plurality of fuzzy values based on the media file into a first plurality of fuzzy logic processing units that utilize a first proper subset set of fuzzy logic rules of the fuzzy logic expert service to generate fuzzy value outputs, and inputting the fuzzy value outputs of the first plurality of fuzzy logic processing units into another fuzzy logic processing unit that utilizes a second proper subset set of fuzzy logic rules of the fuzzy logic expert service to generate the piracy risk score.

3. The computer-implemented method of claim 2, further comprising:
including a correlation identification value, that corresponds to the file, with the plurality of fuzzy values;
propagating the correlation identification values with the fuzzy value outputs into the first plurality of fuzzy logic processing units;
propagating the correlation identification values with the fuzzy value outputs into the another fuzzy logic processing unit; and
determining that the piracy risk score generated by the another fuzzy logic processing unit is for the file of a plurality of files based on at least one of the correlation identification values provided, with the fuzzy value outputs, to the another fuzzy logic processing unit.

4. A computer-implemented method comprising:
receiving a request at a content delivery service from a user for a file;
generating a piracy risk score with greater than two possible values for the file by a fuzzy logic expert service of the content delivery service;
inserting a covert watermark into the file and sending the file with the covert watermark to the user based on the piracy risk score with greater than two possible values not exceeding a threshold;
performing a remedial action for the file, requested by the user, based on the piracy risk score with greater than two possible values exceeding the threshold,
scanning for the covert watermark in a data store external from the content delivery service and external from the user to detect a possible pirated version of the file; and
triggering generation of a fuzzy logic rule of the fuzzy logic expert service based on detection of the covert watermark in the data store external from the content delivery service and external from the user.

5. The computer-implemented method of claim 4, wherein the generating comprises inputting a plurality of fuzzy values based on the file into a first plurality of fuzzy logic processing units that utilize a first proper subset set of fuzzy logic rules of the fuzzy logic expert service to generate fuzzy value outputs, and inputting the fuzzy value outputs of the first plurality of fuzzy logic processing units into another fuzzy logic processing unit that utilizes a second proper subset set of fuzzy logic rules of the fuzzy logic expert service to generate the piracy risk score.

6. The computer-implemented method of claim 5, further comprising:
including a correlation identification value, that corresponds to the file, with the plurality of fuzzy values;
propagating the correlation identification values with the fuzzy value outputs into the first plurality of fuzzy logic processing units;
propagating the correlation identification values with the fuzzy value outputs into the another fuzzy logic processing unit; and
determining that the piracy risk score generated by the another fuzzy logic processing unit is for the file of a plurality of files based on at least one of the correlation identification values provided, with the fuzzy value outputs, to the another fuzzy logic processing unit.

7. The computer-implemented method of claim 4, wherein the inserting the covert watermark into the file that is sent to the user is based on the piracy risk score not exceeding the threshold and a value score based on a cost of the file exceeding a value threshold.

8. The computer-implemented method of claim 7, further comprising not inserting the covert watermark into the file that is sent to the user based on the piracy risk score not exceeding the threshold, and the value score based on the cost of the file not exceeding the value threshold.

9. The computer-implemented method of claim 4, wherein the inserting the covert watermark into the file that is sent to the user is based on the piracy risk score not exceeding the threshold and a value score based on a popularity of the file exceeding a value threshold.

10. The computer-implemented method of claim 9, further comprising not inserting the covert watermark into the file that is sent to the user based on the piracy risk score not exceeding the threshold, and the value score based on the popularity of the file not exceeding the value threshold.

11. The computer-implemented method of claim 4, wherein the performing the remedial action for the file, requested by the user, based on the piracy risk score exceeding the threshold comprises blocking the sending of the file to the user.

12. The computer-implemented method of claim 11, further comprising sending an indication to the user that the file is blocked from being sent to the user, and an identification of at least one rule of a set of fuzzy logic rules of the fuzzy logic expert service that triggered the blocking.

13. The computer-implemented method of claim 4, wherein the performing the remedial action for the file, requested by the user, based on the piracy risk score exceeding the threshold comprises sending a reduced quality version of the file to the user.

14. The computer-implemented method of claim 13, further comprising sending an indication to the user that the file is the reduced quality version, and an identification of at least one rule of a set of fuzzy logic rules of the fuzzy logic expert service that triggered sending the reduced quality version.

15. A system comprising:
one or more electronic devices configured to implement a storage service to store a file; and
one or more electronic devices configured to implement a content delivery service, the content delivery service including instructions that upon execution cause the content delivery service to perform a method comprising:
receiving a request at the content delivery service from a user for the file,
generating a piracy risk score with greater than two possible values for the file by a fuzzy logic expert service of the content delivery service,
inserting a covert watermark into the file and sending the file with the covert watermark to the user based on the piracy risk score with greater than two possible values not exceeding a threshold,
performing a remedial action for the file, requested by the user, based on the piracy risk score with greater than two possible values exceeding the threshold,
scanning for the covert watermark in a data store external from the content delivery service and external from the user to detect a possible pirated version of the file, and triggering generation of a fuzzy logic rule of the fuzzy logic expert service based on detection of the covert watermark in the data store external from the content delivery service and external from the user.

16. The system of claim 15, wherein the generating of the method comprises inputting a plurality of fuzzy values based on the file into a first plurality of fuzzy logic processing units that utilize a first proper subset set of fuzzy logic rules of the fuzzy logic expert service to generate fuzzy value outputs, and inputting the fuzzy value outputs of the first plurality of fuzzy logic processing units into another fuzzy logic processing unit that utilizes a second proper subset set of fuzzy logic rules of the fuzzy logic expert service to generate the piracy risk score.

17. The system of claim 16, wherein the instructions upon execution cause the content delivery service to perform the method further comprising:
including a correlation identification value, that corresponds to the file, with the plurality of fuzzy values;
propagating the correlation identification values with the fuzzy value outputs into the first plurality of fuzzy logic processing units;
propagating the correlation identification values with the fuzzy value outputs into the another fuzzy logic processing unit; and
determining that the piracy risk score generated by the another fuzzy logic processing unit is for the file of a plurality of files based on at least one of the correlation identification values provided, with the fuzzy value outputs, to the another fuzzy logic processing unit.

18. The system of claim 15, wherein the instructions upon execution cause the content delivery service to perform the method wherein the inserting the covert watermark into the file that is sent to the user is based on the piracy risk score not exceeding the threshold and a value score based on a popularity of the file exceeding a value threshold.

19. The system of claim 15, wherein the performing the remedial action for the file, requested by the user, based on the piracy risk score exceeding the threshold comprises blocking the sending of the file to the user.

20. The system of claim 15, wherein the performing the remedial action for the file, requested by the user, based on the piracy risk score exceeding the threshold comprises sending a reduced quality version of the file to the user.

* * * * *